TELEVISION SYNCHRONIZING SYSTEM

Filed June 3, 1958 2 Sheets-Sheet 1

INVENTOR.
SAMUEL A. SCHWARTZ

BY George C. Sullivan
Agent

Feb. 6, 1962 S. A. SCHWARTZ 3,020,340

TELEVISION SYNCHRONIZING SYSTEM

Filed June 3, 1958 2 Sheets-Sheet 2

*INVENTOR.*
SAMUEL A. SCHWARTZ

BY

[signature]

Agent

United States Patent Office 3,020,340
Patented Feb. 6, 1962

3,020,340

TELEVISION SYNCHRONIZING SYSTEM

Samuel A. Schwartz, Los Altos, Calif., assignor to Lockheed Aircraft Corporation, Burbank, Calif.

Filed June 3, 1958, Ser. No. 739,495
7 Claims. (Cl. 178—6)

The present invention relates to television synchronization and more particularly to television synchronizing systems having improved transmission and reception of synchronization signals.

In the transmission of television signals, superimposed synchronization signals require added power which may not be available. In those instances and for other reasons the synchronization signals may be transmitted by a sub-carrier which requires substantially less power than superimposing the synchronization signals on the video signals as in the conventional manner of transmission for commercial television.

The foregoing synchronizing system is advantageous in providing a certain amount of secrecy in avoiding reception on conventionally designed receivers even though these receivers may include the frequency bandwidth of the present system.

Another advantage of the present system is the use of sinusoidal synchronization signals in which the synchronization signal generating and handling circuitry is simplified by reducing the bandwidth requirements over the square or steep front and back wave forms of the more common synchronization pulse type signals.

Above all other advantages is the improved synchronization of a multiplex or television receiver over longer distances at lower transmitter power outputs than a television or multiplex transmission system using superimposed synchronization signals on the picture or other information signal.

It is, therefore, an object of the present invention to provide a synchronizing system having improved synchronization.

Another object is the provision of a television system requiring less power in transmission and having improved synchronization.

A further object of the invention is to provide a reliable synchronizing system for the transmission of television signals.

Still another object is the provision of a system for transmission of television signals having synchronizing signals narrowed to within a minimum bandwidth for improved signal to noise ratio.

A still further object of the present invention is to provide security in the transmisison of television signals.

Other objects and features of the invention will become apparent to those skilled in the art if disclosure is made in the following detailed description of a preferred embodiment of the invention as illustrated in the accompanying drawings in which.

Figures 1, 2:
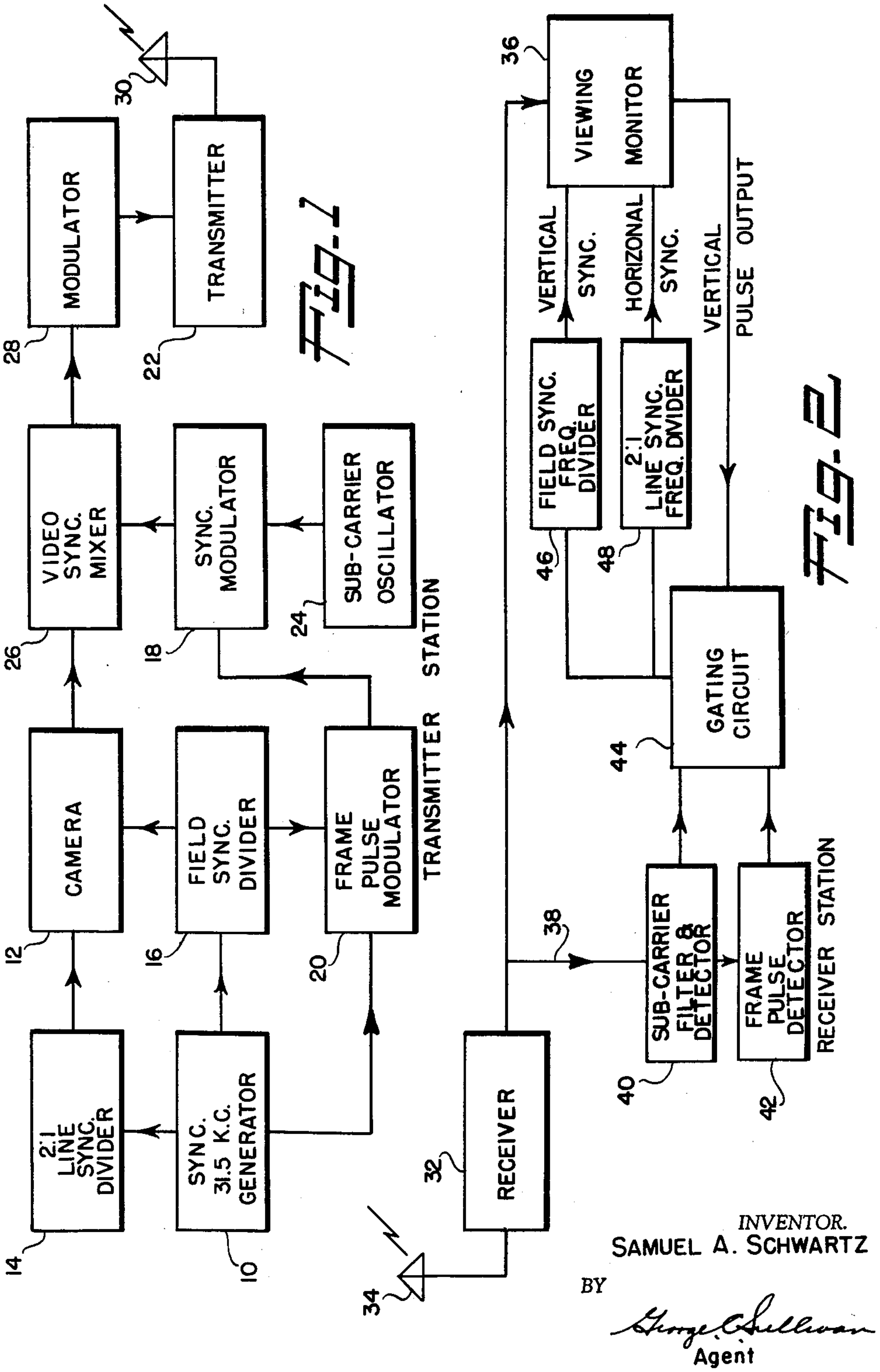
FIGURE 1 is a block diagram of a preferred embodiment of the transmitter station of the invention.
FIGURE 2 is a block diagram of a preferred receiver station of the invention.
Figures 3, 4:
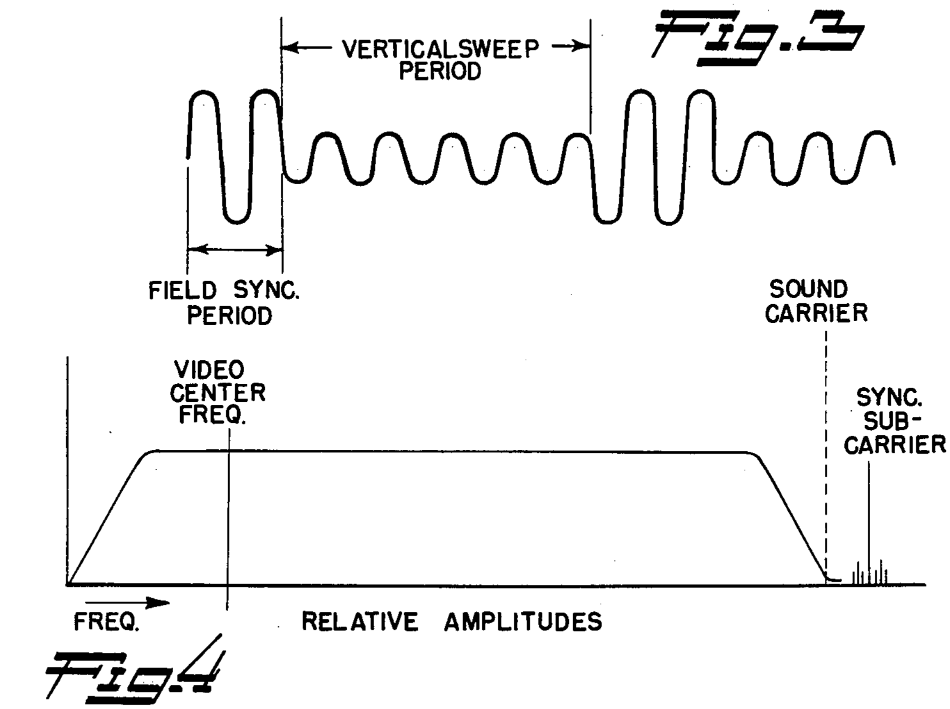
FIGURE 3 illustrates typical wave forms of the synchronization signal of the preferred embodiment of the invention.
FIGURE 4 illustrates relative amplitudes of portions of the transmitted television signal.
Figures 5A, 5B:
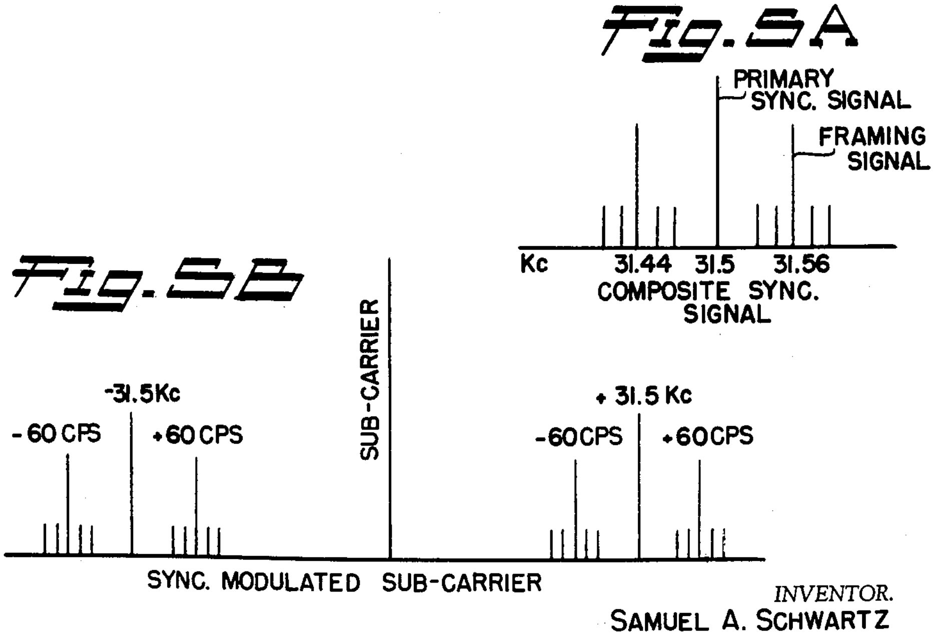
FIGURES 5A and 5B are diagrams illustrating the frequency spectrum of the output of certain circuits.

Referring now to the drawings wherein like reference characters designate like or corresponding parts throughout the several views, there is shown in FIGURES 1 and 2, which illustrate a preferred embodiment, a television system in which sinusoidal synchronization signals shown in FIGURES 3, 5A and 5B are transmitted on a sub-carrier along with the remainder of a multiplex or television signal.

In the preferred embodiment of the invention, a combined synchronization signal is separated from the remainder of the television signal in a receiver providing a synchronization signal separator. The synchronization signal less the sub-carrier is passed to horizontal and vertical deflection circuits of a viewing monitor in the receiver through a gating circuit and field and line frequency dividers.

The gating circuit passes or gates the synchronization signal upon coincidence of a vertical pulse output feedback of a vertical deflection circiut and a frame pulse individually coupled to the gating circuit. The synchronization of the receiver station in the system is completely independent of amplitude modulation and thereby substantially all noise. The field and line frequency dividers are dependent only upon the frequency and phase of the synchronization signal coupled into the receiver. Preferably, the modulation of the synchronization signal by the frame pulse is detected and utilized only for gating of the remainder of the synchronization signal.

Referring to FIGURE 1 for a detailed description of the preferred embodiment, a sinusoidal synchronization signal is generated by a synchronization generator 10, or oscillator, and coupled to a camera 12 through line and field synchronization signal frequency dividers 14 and 16, and to a synchronization modulator 18 through a frame pulse modulator 20 for modulating a sub-carrier to produce a combined synchronization signal having a frequency spectrum as shown in FIGURE 5B which can be mixed and transmitted with a video signal by a transmitter 22.

In the preferred arrangement, the synchronization signal generator 10 has a substantially sinusoidal primary synchronization signal output frequency of 31.5 kc. (kilocycles). Preferably, the synchronization generator 10 is crystal controlled for stable oscillation at 31.5 kc. A portion of the output of the synchronization generator 10 is coupled to the line synchronization divider 14 which divides the 31.5 kc. signal by 2. The output of the line synchronization divider, a 15,750 cycle signal, is coupled to the camera 12 to be suitably modified for controlling the horizontal scanning operation.

The vertical scanning of the camera 12 is synchronized or controlled by the output of the field synchronization divider 16, a divider chain having an input coupled to the synchronization generator 10 and 60 cycle signal outputs coupled to the camera 12 and frame pulse modulator 20. The field synchronization divider chain divides the 31.5 kc. signal by 15 to 1, 7 to 1, and 5 to 1 in sequence, to arrive at a vertical sweep synchronization rate of 60 c.p.s. (cycles per second). Thus, the primary synchronization signal of 31.5 kc. has been divided in individual line and field divider chains to derive a 15.75 kc. frequency signal for horizontal deflection synchronization and a 60 c.p.s. signal for vertical deflection synchronization.

The primary synchronization signal is also transmitted to the receiver station for synchronization of the video signal in a viewing monitor. The synchronization signal or portion of the output of the synchronization generator 10 intended for the receiver is coupled to the synchronization modulator 18 after 60 c.p.s. pulse modulation in the frame pulse modulator 20. The composite synchronization signal output of the frame pulse modulator 20, illustrated by typical wave forms in FIGURE 3 and the frequency spectrum in FIGURE 5A, is coupled to the synchronization modulator 18 along with the output of a sub-carrier oscillator 24 whereby the subcarrier is modulated by the primary 31.5 kc. signal and the framing or field 60 cycle signal.

The output of the synchronization modulator 18 illustrated by a typical frequency spectrum in FIGURE 5B is coupled to the video synchronization mixer 26 to combine the synchronizing signal and the video and/or sound output of the camera prior to coupling the combined signals to a modulator 28 for transmission by an antenna 30 or by closed circuit to a receiver 32. Typical relative amplitudes of signal transmission are shown in FIGURE 4. Preferably, the relative positions of the video center frequency, sound carrier and synchronization sub-carrier are as shown. In the preferred arrangement, the synchronization signal sub-carrier is located at the higher frequency end of a channel's television signal frequency band.

In FIGURE 3, the output of the frame pulse modulator 20 has been shown by the sinusoidal wave form having a constant amplitude during the vertical sweep period which is increased in amplitude during the field synchronization or vertical retrace time. In the preferred arrangement, the 60 cycle modulation of the primary synchronization signal serves to provide the second coincident signal in a coincident signal gating circuit in the receiver station and preferably the amplitude modulations are not utilized for vertical or horizontal synchronization as might ordinarily be expected. The advantages of this arrangement will become more apparent from the following detailed description of the receiver station of FIGURE 2.

As shown in FIGURE 2, a transmitted television signal is intercepted by a receiver antenna 34. The receiver 32 may be a conventional broadband receiver which can be selectively tuned to the desired signal band of transmission of the transmitter station of FIGURE 1. The receiver 32 also may demodulate the television signal removing the carrier and amplifying the resultant intermediate frequency signal which is again detected and amplified to provide the combined television signal suitable for coupling to the remainder of the receiver station's circuits. The combined amplified video output signal of the receiver 32 is coupled directly to a viewing monitor 36 providing picture information and to the synchronization circuits in the receiver station through line 38.

A sub-carrier filter 40 is narrowly tuned to the frequency of the sub-carrier oscillator including side bands. This portion of the circuit, including a detector, operates as a synchronization signal separator circuit where the output of the sub-carrier filter and detector is the composite synchronization signal of FIGURE 3. The composite synchronization signal is coupled to a frame pulse detector 42 to extract the 60 c.p.s. framing pulse which provides a gating signal that is coupled to a gating circuit 44 along with a vertical pulse output of the vertical deflection circuits in the viewing monitor 36. The vertical pulse output is the other coincident signal of the pair of coincident signals for passing the composite synchronization signal output of the sub-carrier filter and detector 40 through the gating circuit 44 to the field and line synchronization frequency dividers 46 and 48 respectively.

The field and line synchronization frequency dividers 46 and 48 in the receiver station operate in the same or similar manner to the line and field synchronization dividers 14 and 16 in the transmitter station to produce a 15.75 kc. horizontal synchronization signal for the horizontal deflection circuits and a 60 c.p.s. vertical synchronization signal for synchronizing the vertical deflection circuits in the viewing monitor 36. Thus the video information presented in the viewing monitor is synchronized to the camera in the transmitter station.

The gating circuit 44 is arranged to pass the primary synchronization signal output of the sub-carrier filter and detector 40 to the frequency dividers 46 and 48 upon coincidence of the framing pulse output of the frame pulse detector 42 and the vertical pulse output of the viewing monitor 36. By employing a separate sub-carrier for the transmission synchronization signals and the gating circuit in the receiver, a very stable picture is produced on the viewing monitor 36 and the synchronization system displays very high noise immunity.

Further, as pointed out supra, considerable less transmitting power is required by avoiding superimposing of the synchronization signals on the video signal. This may be illustrated by the fact that in many instances the picture level should extend to a maximum of 75% of the peak carrier amplitude of television signals wherein the additional 25% in amplitude for the superimposed synchronization signal approximately doubles the transmission power. The effect of the decrease in the required transmission power in the present invention to transmit synchronization signals while eliminating noise in the synchronization signal provides for a superior method and apparatus of synchronization. Further, the sinusoidal wave form reduces the need for complex circuitry due to the decrease in band pass requirements.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. In a television system including transmitter and receiver stations, an oscillator in the transmitter station having a fixed frequency sine wave primary signal output which is an even multiple of the picture line frequency of the system, frequency divider means responsive to said sine wave primary signal output and providing line and field synchronization signals for the transmitter station, means generating a sub-carrier signal, modulator means responsive to said frequency divider means and said oscillator and modulating said sub-carrier signal to provide a composite synchronization signal including both primary and framing signals for said receiver station, synchronization separator circuit means in the receiver station detecting the composite synchronization signal, receiver station frequency dividers for dividing the primary signal to produce horizontal and vertical synchronization pulses for the receiver station horizontal and vertical deflection circuits, gating circuit means coupling the synchronization separator to the frequency dividers, and feedback circuit means coupling the vertical pulse output of the deflection circuits in the receiver station to the gating circuit wherein coincidence of the framing signal in the composite synchronization signal and the vertical pulse passes the composite synchronization signals to the dividers.

2. In a television system including transmitter and receiver stations, an oscillator in the transmitter station having a fixed frequency sine wave primary signal output which is an even multiple of the picture line frequency of the system, frequency divider means responsive to said sine wave primary signal output and providing line and field synchronization signals for the transmitter station, modulator means responsive to said frequency divider means and said oscillator and providing a composite synchronization signal including both primary and framing signals for said receiver station, synchronization separator circuit means in the receiver station detecting the composite synchronization signal, receiver station frequency dividers for dividing the primary signal to produce horizontal and vertical synchronization pulses for the receiver station horizontal and vertical deflection circuits, gating circuit means coupling the synchronization separator with the frequency dividers, and feedback circuit means coupling the vertical pulse output of the deflection circuits in the receiver station with the gating circuit wherein coincidence of the framing signal in the composite synchronization signal and the vertical pulse passes the composite synchronization signals to the dividers.

3. In a television system, a receiver including a demodulator for demodulating television signals including a composite primary and framing synchronization signal on a sub-carrier, synchronization signal separator circuit means coupled to the demodulator for passing the sub-carrier and detecting the composite signals, framing detector circuit means coupled to the separator for detecting the framing signal, gating circuit means coupled to the synchronization separator and to the framing detector for passing the composite signal, frequency dividers for horizontal and vertical deflection circuits coupled to the gating circuit output for producing horizontal and vertical synchronization deflection pulses and feedback circuit means coupling the vertical pulse output of the deflection circuits to the gating circuit wherein coincidence of the framing signal and vertical output pulse gates the composite synchronization signal.

4. In a television system, a receiver including a demodulator for demodulating television signals including a composite sinusoidal primary and framing synchronization signal on a sub-carrier, synchronization separator circuit means coupled to the demodulator for passing the sub-carrier and detecting the composite signals, circuit means for detecting the framing signal, gating circuit means coupled to the synchronization separator and to the framing detector for passing the composite signal, horizontal and vertical deflection circuit means, frequency dividers coupled to the gated output of the gating circuit for dividing the primary signal to produce horizontal and vertical synchronization pulses for the horizontal and vertical deflection circuits and feedback circuit means coupling the vertical pulse output of the deflection circuits to the gating circuit wherein coincidence of the framing signal and vetrical pulse passes the composite synchronization signals to the dividers.

5. In a television system, including transmitter and receiver stations, means generating a substantially primary sinusoidal synchronization signal having a frequency which is an even multiple of a picture line frequency, means dividing said signal to provide framing and line synchronization signals for a television camera, means responsive to the last two mentioned means and modulating the primary synchronization signal by the framing signals to produce a composite signal, oscillator means generating a sub-carrier signal at a frequency within a television transmitter frequency band and near the higher frequency end of the video signal frequencies, means modulating said sub-carrier signal with said composite signal and transmitting the modulated sub-carrier along with video signals.

6. In a television system including a transmitter and receiver, oscillator means generating a primary synchronization signal having a higher frequency than the television picture framing signals, means modulating the primary signal by said framing signal to produce a composite synchronization signal; a second oscillator means generating a sub-carrier signal, means modulating said subcarrier by said composite signal and transmitting the subcarrier along with the remainder of a television signal, means receiving the television signal and separating the sub-carrier including the composite synchronization signal, means detecting the composite synchronization signal and the framing signals, means gating the composite signal by coincidence of the framing signals and a vertical pulse output of vertical deflection circuits of the receiver, and means dividing the gated composite signal to produce a vertical synchronization signal for synchronization of the receiver to the transmitter.

7. In a television system, oscillator means generating a sinusoidal primary synchronization signal having a frequency which is an even multiple of a picture line frequency, means dividing said signal to provide framing and line synchronization signals for a television camera, means modulating the primary synchronization signals by the framing signals to produce a composite signal, second oscillator means generating a sub-carrier signal within a television transmitter frequency band adjacent the video signal frequency, means modulating said sub-carrier with said composite signal and transmitting the sub-carrier along with sound and video signals, receiver means receiving and demodulating the transmitted signals and separating the synchronization signals and detecting the framing signals; means gating the composite synchronization signals by coincidence of the framing signals and vertical pulses of the vertical deflection circuits of the receiver, and means coupled with said gating means and dividing the composite signal to produce vertical and horizontal synchronization signals for controlling vertical and horizontal deflection of the receiver.

References Cited in the file of this patent

UNITED STATES PATENTS

| | | |
|---|---|---|
| 2,201,309 | Goldsmith | May 21, 1940 |
| 2,231,971 | Tubbs | Feb. 18, 1941 |
| 2,266,802 | Ressler | Dec. 23, 1941 |
| 2,310,197 | Hansell | Feb. 2, 1943 |
| 2,838,605 | Bigelow | June 10, 1958 |